(12) United States Patent
Lee

(10) Patent No.: US 8,376,711 B2
(45) Date of Patent: Feb. 19, 2013

(54) DUAL ROTOR WIND TURBINE

(75) Inventor: Seungbae Lee, Seoul (KR)

(73) Assignee: Aeronet Inc., Seoul (KR)

( * ) Notice: Subject to any disclaimer, the term of this patent is extended or adjusted under 35 U.S.C. 154(b) by 641 days.

(21) Appl. No.: 12/607,094

(22) Filed: Oct. 28, 2009

(65) Prior Publication Data

US 2010/0104417 A1    Apr. 29, 2010

(30) Foreign Application Priority Data

Oct. 28, 2008  (KR) .................. 10-2008-0105672
Oct. 19, 2009  (KR) .................. 10-2009-0099249

(51) Int. Cl.
*F03D 3/04* (2006.01)

(52) U.S. Cl. .............. 416/197 A; 416/244 R; 416/9; 415/191; 415/4.2

(58) Field of Classification Search .......... 415/4.2, 415/4.4, 907, 909, 191; 416/197 A, 197 R, 416/DIG. 6, DIG. 9, 244 R, 9
See application file for complete search history.

(56) References Cited

U.S. PATENT DOCUMENTS

| | | | | |
|---|---|---|---|---|
| 16,346 | A * | 1/1857 | Wentworth | 415/4.1 |
| 705,922 | A * | 7/1902 | Gran | 415/151 |
| 4,838,757 | A * | 6/1989 | Benesh | 415/4.4 |
| 5,350,273 | A * | 9/1994 | Hector et al. | 415/4.1 |
| 7,315,093 | B2 * | 1/2008 | Graham, Sr. | 290/55 |
| 2007/0269304 | A1 * | 11/2007 | Burg | 415/4.2 |

* cited by examiner

*Primary Examiner* — Ninh H Nguyen
*Assistant Examiner* — Adam W Brown
(74) *Attorney, Agent, or Firm* — NSIP Law

(57) ABSTRACT

Provided is a dual rotor wind turbine having two rotor assemblies. In the dual rotor wind turbine, an inlet guide vane is placed at a lower location in front of each rotor assembly and a rotor shaft of the rotor assemblies is placed in back of a vertical shaft, so that the rotor shaft is offset from the vertical shaft. Thus, the gravity center of the wind turbine is located in a lower portion of the wind turbine, so that a stable balance of the wind turbine can be realized and the vertical shaft can be smoothly rotated relative to a fixed shaft.

8 Claims, 13 Drawing Sheets

DUAL ROTOR WIND TURBINE

CROSS-REFERENCE TO RELATED APPLICATION(S)

This application claims the benefit under 35 U.S.C. §119(a) of Korean Patent Application Nos. 10-2008-0105672 filed Oct. 28, 2008 and 10-2009-0099249 filed Oct. 19, 2009, in the Korean Intellectual Property Office, the entire disclosure of which are incorporated herein by reference for all purposes.

BACKGROUND

1. Field

The following description relates, in general, to dual rotor wind turbines and, more particularly, to a dual rotor wind turbine, which has two rotor assemblies and in which inlet and upper guide vanes are placed at lower and higher locations in front of each rotor assembly, and a rotor shaft of the rotor assemblies is placed downstream of a vertical shaft, so that the rotor shaft is offset from the vertical shaft.

2. Description of the Related Art

Generally, wind turbine systems are classified into horizontal axis wind turbine systems and vertical axis wind turbine systems. Further, a hybrid wind turbine system, which is a combined wind turbine system, has been proposed. The efficiency of a vertical axis wind turbine is approximately half that of a horizontal axis wind turbine. However, the vertical axis wind turbine has a low rotor rpm, so that it produces low levels of noise and vibrations. Therefore, the vertical axis wind turbines are preferably used in buildings and public facilities, such as schools and hospitals. Further, even though the vertical axis wind turbines are produced using parts and blades having a low precision, they can be used for a lengthy period of time and can effectively produce electricity, so that they can be used in independent, small-sized wind turbine systems. However, in order to provide a vertical axis wind turbine system for distributed power generation essential to environment-friendly regional development, it is required to reduce the weight of the turbine and realize desired price competitiveness of the turbine by increasing the turbine efficiency, thereby realizing compactness of the turbine and using fewer blades and parts.

Generally, the vertical axis wind turbines for distributed power generation, which produce low levels of noise and can be preferably used in a housing complex, are classified into Savonius drag type turbines and Darrieus lift type turbines. The drag type turbines have been developed in a manner in which the number of blades is increased and a vane is devised in order to increase the turbine efficiency. The lift type turbines have been developed to cross-flow turbines.

However, a jet wheel type vertical axis wind turbine, which is devised by installing an inlet guide vane in the inlet of the Savonius turbine, thus overcoming the low efficiency of the Savonius turbine and using the advantages of the Savonius turbine capable of producing torque at low rpm, has been proposed. In other words, the jet wheel type vertical axis wind turbine maximizes the positive torque parts in the blades of the Savonius turbine and produces low pressure zone in the negative torque parts in the downstream area of the inlet guide vane, thus removing the negative torque.

Described in detail, in the jet wheel type vertical axis wind turbine, an internal flow between blades in the downstream area of the inlet guide vane is prevented and high speed dynamic pressure, received from the inlet guide vane, is converted into static pressure in spaces between the blades in the downstream area of the inlet guide vane, so that a relatively low pressure produced by a high speed flow on a suction surface of the blade can be used to produce torque. Thus, it is required to reduce the cord length of the inlet guide vane. Further, an appropriate radius of curvature is provided to a flow streamline and the blade exit angles are set to realize a maximum distribution of incident angles of attack of rotor blades from the upstream area to the downstream area at a predetermined blade tip speed ratio.

Generally, the Savonius turbine produces torque using a drag force in an upstream blade and makes the flow pass through a downstream blade. However, as shown in FIG. 1, in a conventional jet wheel type turbine 100, a high speed incident flow condition capable of realizing an easy energy conversion is provided both by an inlet guide vane 120 and by a side guide vane 130, and the upper and lower surfaces of the turbine 100 are open, so that an inlet fluid can flow to the hub surface of blades 200 and increase the positive torque and reduce the negative torque, thus improving the turbine performance.

Further, a turbine blade structure for vertical axis wind turbine systems, which can increase the performance of the vertical axis wind turbine system, has been proposed in recent years. In the turbine blade structure, a sweep angle distribution is adapted to the blades 200 of the turbine rotor and each blade 200 is twisted to form a twisted shape, so that a rotating force can be continuously transmitted to the turbine 100 and a streamline from a radial direction to an axial direction can be easily formed.

However, in the jet wheel type turbine, in order to increase the efficiency of the wind turbine system, it is required to make the inlet rotor upstream wind surface area equal to the rotor surface area. Thus, the combined guide vane system having the inlet guide vane 120 and the side guide vane 130 is steered by the tail wing such that the guide vane system can be oriented into the direction of the wind. Therefore, the output performance of the small-sized jet wheel type turbine is increased. That is, at a rated wind speed, the turbine is steered by the tail wing such that the inlet guide vane 120 is oriented into the direction of the wind. At a wind speed over the rated wind speed, the tail wing starts to fold and all the guide vanes are rotated at regular angles relative to the direction of the wind. Therefore, the rpm of the turbine rotor is reduced, thus reducing the output power of the turbine rotor and preventing overload of the generator.

However, the rotating force typically acting on the inlet guide vane is stronger than the opposite directional rotating force acting on the side guide vane, so that, in order to steer the guide vane system in the same direction as the direction of the wind, a stabilizer and a rudder are required, both having large surface areas. Further, when a rotating force acts on a hinge due to abnormal spring elasticity caused by a pressure difference between the positive pressure surface and the suction surface of the rudder at a wind speed which is too fast, a difference in the torque balance is generated in the guide vane system, so that the guide vane system rotates to cancel the torque imbalance and is stopped. Therefore, during the guide vane motion, the load caused by a high wind acts on the rudder. Due to the torque unbalance of the guide vane system, the tail wing surface area and the weight of the tail wing are both increased, so that the jet wheel type turbine has a first problem of the guide vane system possibly leaning toward the tail wing and a second problem of the turbine structure having to be excessively reinforced due to the wind load acting on the rudder at a wind speed which is too fast.

SUMMARY

Accordingly, according to one general aspect, there is provided a dual rotor wind turbine, which is of increased performance and the gravity center of which is located in a downstream portion thereof, thus realizing stable balance, so that a vertical shaft can be stably rotated relative to a fixed shaft.

According to another aspect, there is provided a dual rotor wind turbine comprising: a column; and a generating unit comprising: a vertical shaft rotatably mounted to the column, a main frame mounted to the vertical shaft, a rotor assembly horizontally placed in each side of the vertical shaft and rotatably mounted to the main frame, an inlet guide vane mounted to the main frame and placed at a lower location in front of the rotor assembly, an upper guide vane mounted to the main frame, a tail wing connected to the main frame, and a generator connected to the rotor assembly, wherein the rotor assembly comprises: a horizontal rotor shaft, a rotor frame radially and circumferentially mounted to each end of the rotor shaft, and a rotor blade mounted to the rotor frame at a location close to an outside end of the rotor frame, and the rotor shaft is placed in back of the vertical shaft such that the rotor shaft is offset from the vertical shaft.

The generating unit may comprise two generating units and the two generating units may be placed at upper and lower locations. The rotor blade may have an arc shape, an asymmetric arc shape or an airfoil shape.

According to an exemplary embodiment, the wind turbine has two rotor assemblies. Further, the inlet guide vane is placed at a lower location in front of each rotor assembly and the rotor shaft of the rotor assemblies is placed in back of the vertical shaft, so that the rotor shaft is offset from the vertical shaft. Thus, the gravity center of the wind turbine is located in a lower portion of the wind turbine, so that stable balance of the wind turbine can be realized and the vertical shaft can be smoothly rotated with the wind direction relative to a fixed shaft.

Other features and aspects will be apparent from the following detailed description, the drawings, and the claims.

Figure 1:
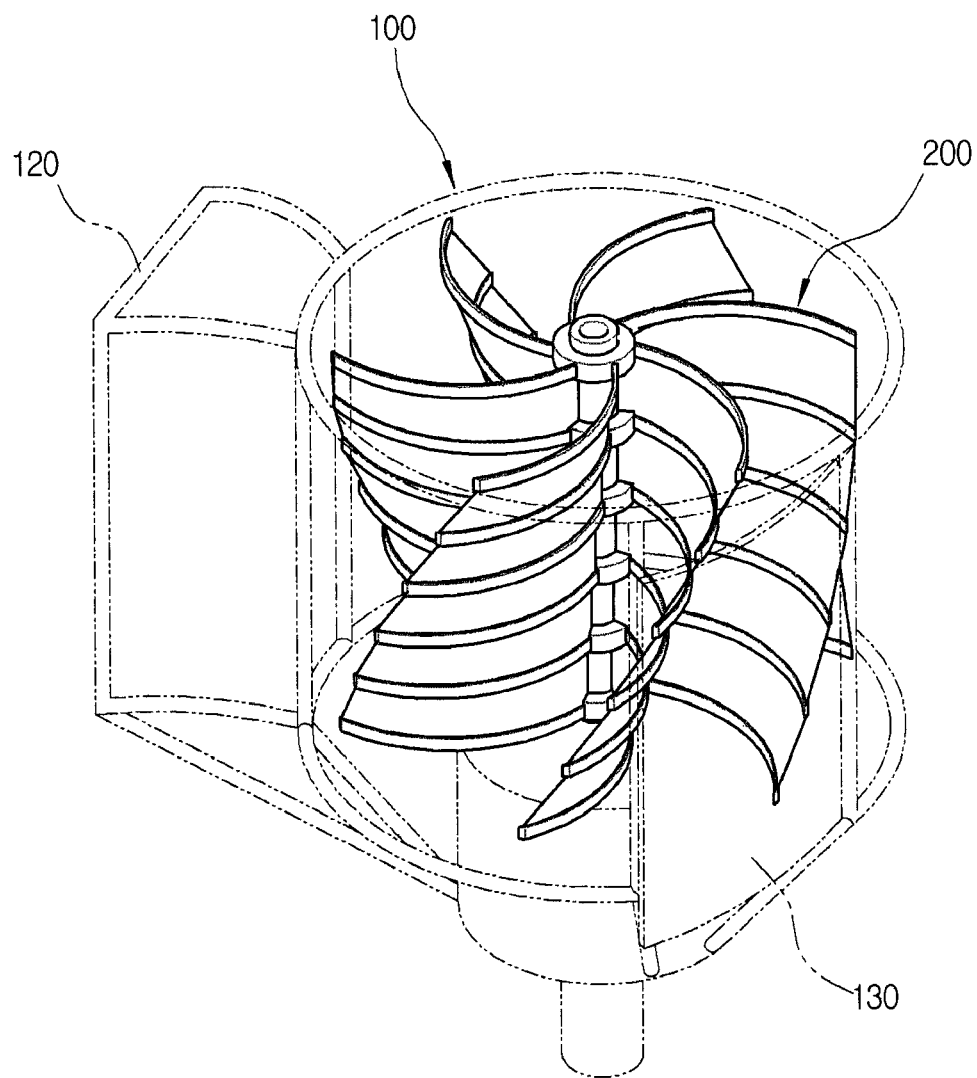
FIG. 1 is a perspective view of a conventional wind turbine.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In the following description, the same elements as those in the conventional wind turbine may be referred to and further explanation thereof will thus be omitted.

Figure 2:
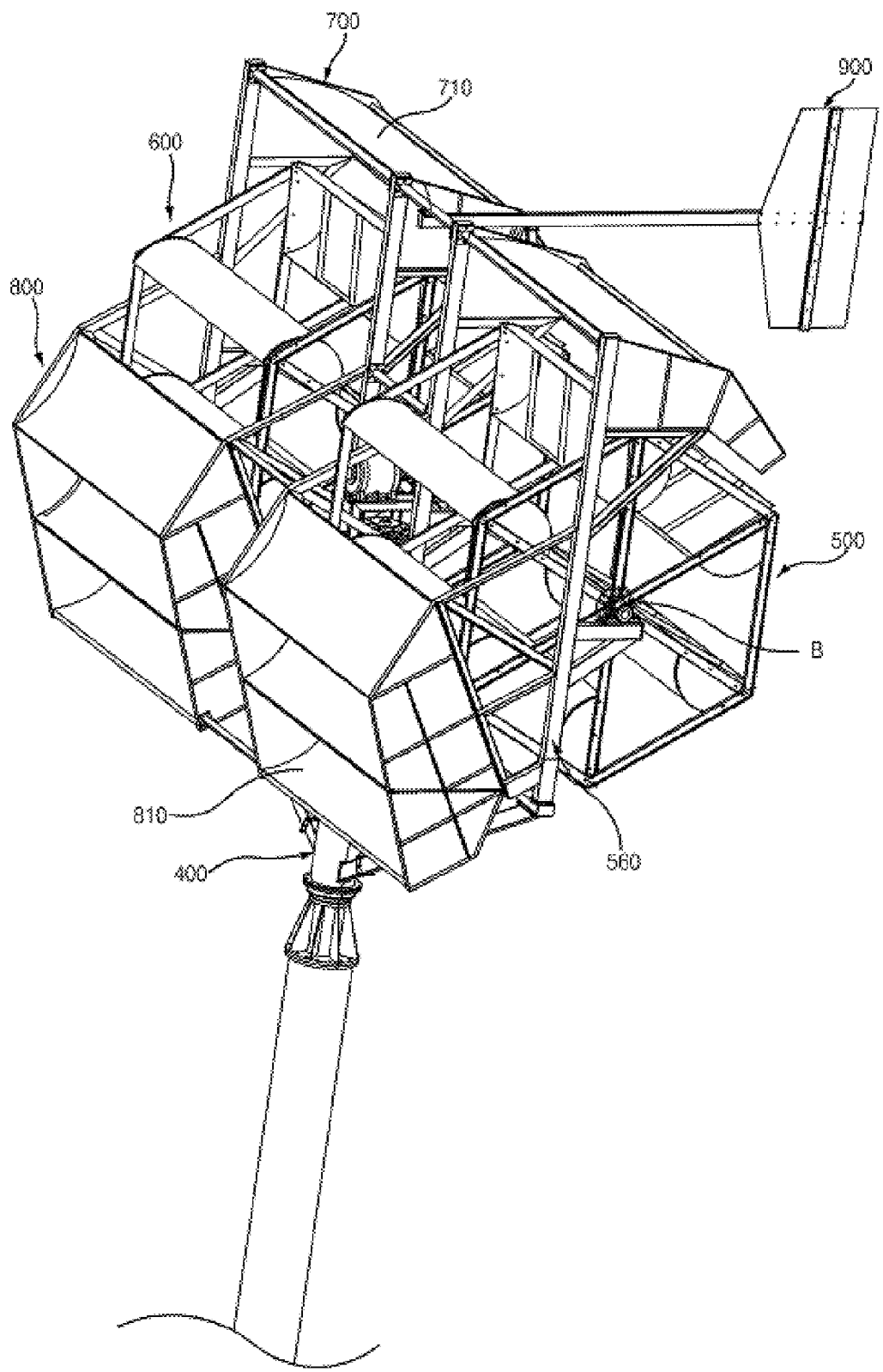
FIG. 2 is a perspective view showing a dual rotor wind turbine according to a first exemplary embodiment.
Figure 3:
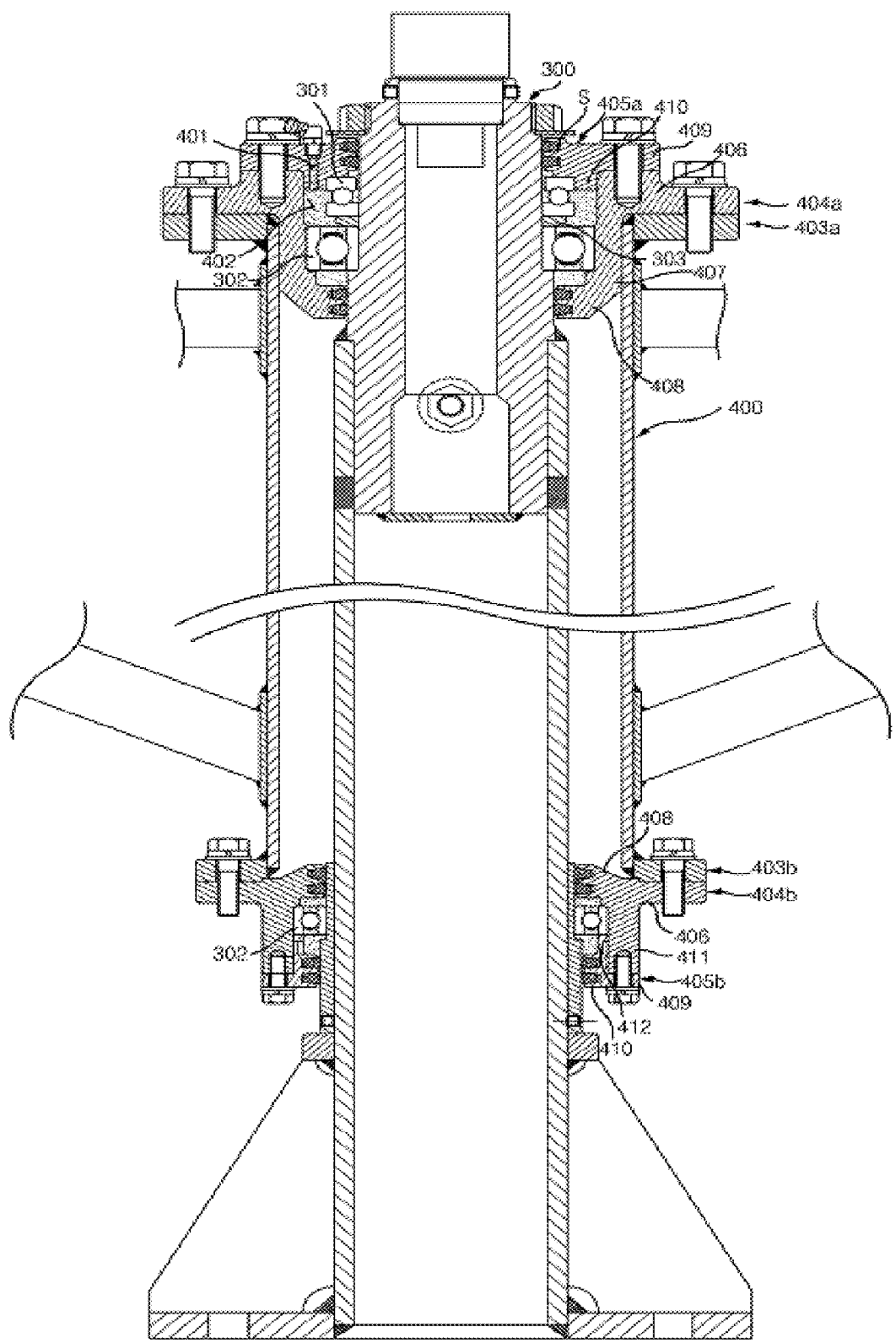
FIG. 3 is a sectional view showing the dual rotor wind turbine according to the first exemplary embodiment, in which a vertical shaft is assembled with a column.
Figure 4:
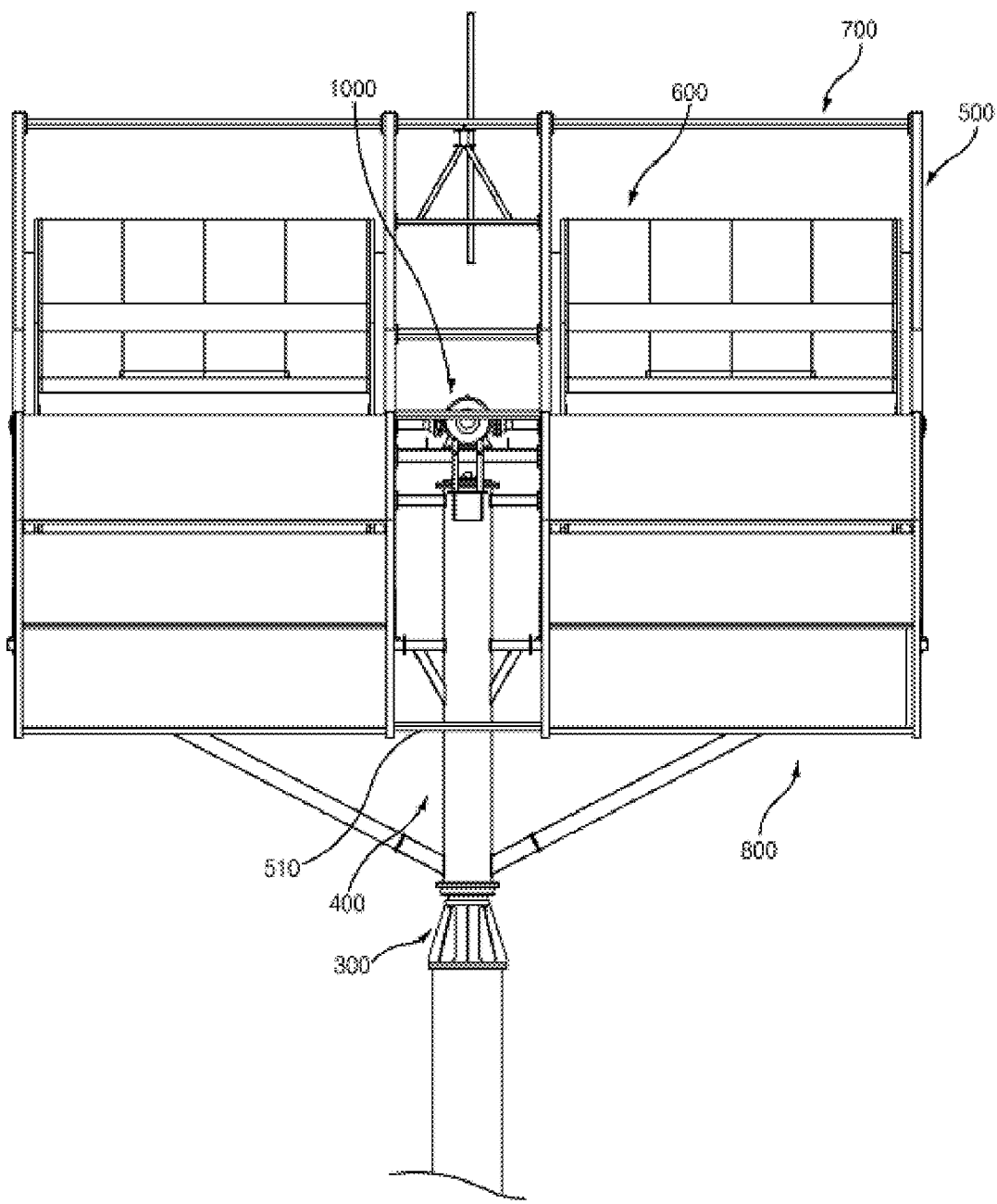
FIG. 4 is a front view of the dual rotor wind turbine according to the first exemplary embodiment.
Figure 5:
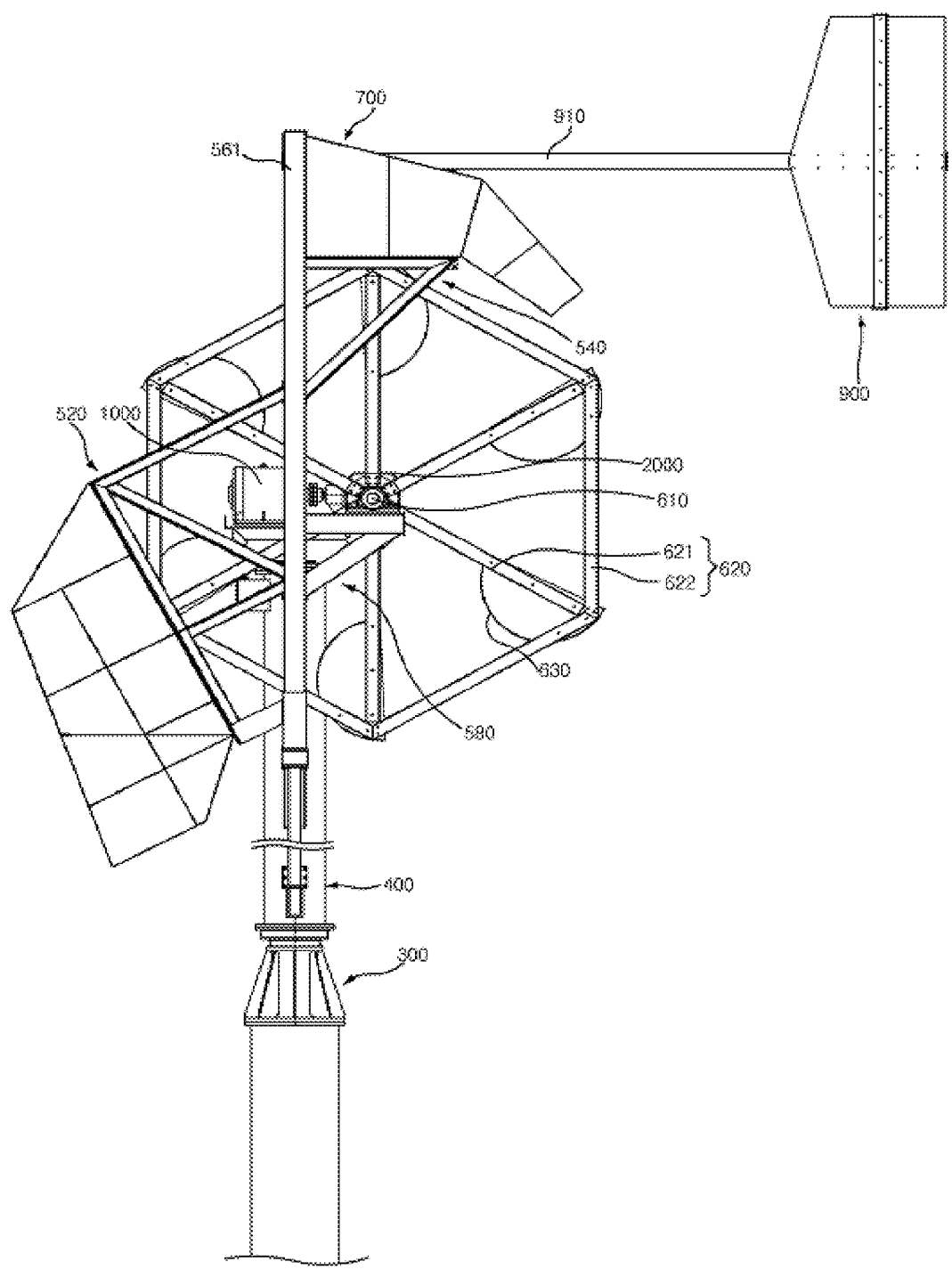
FIG. 5 is a side view of the dual rotor wind turbine according to the first exemplary embodiment.
Figure 6:
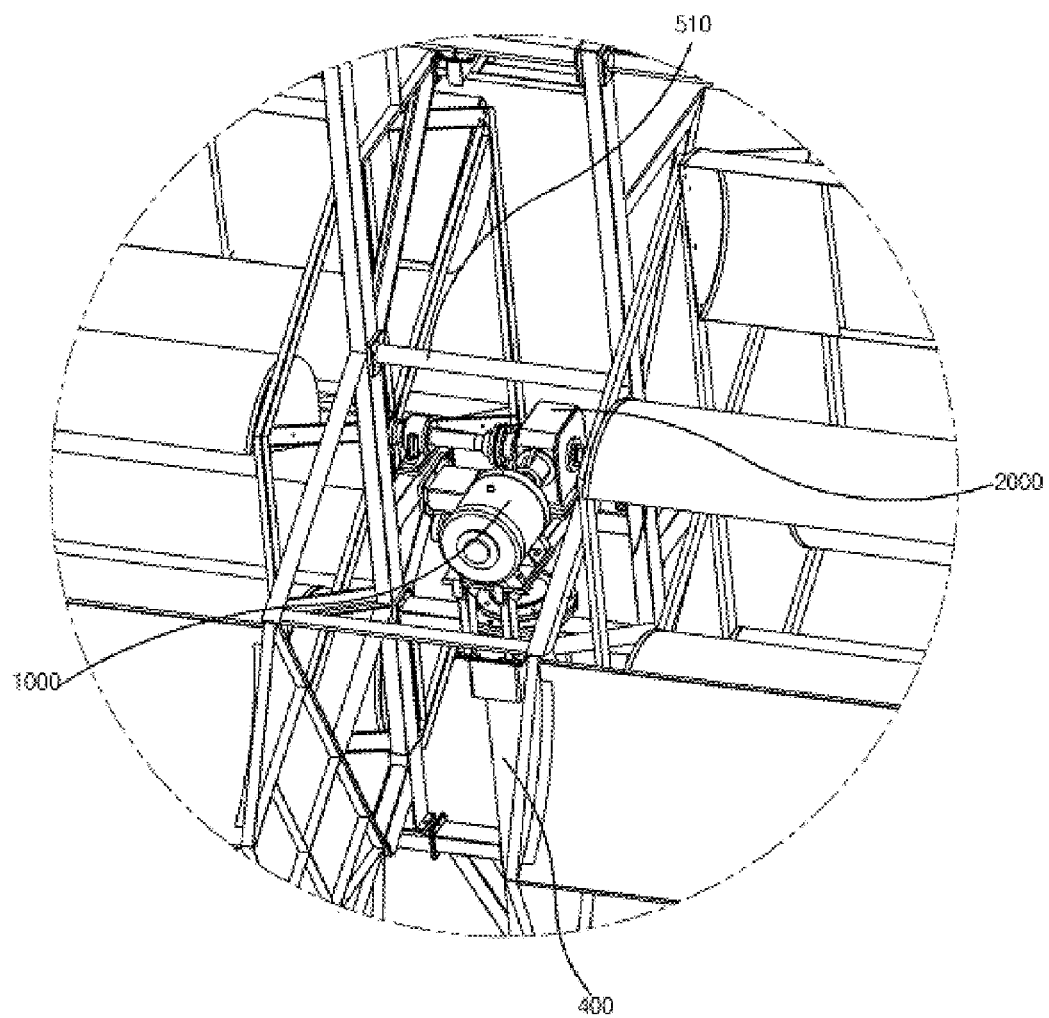
FIG. 6 is an enlarged perspective view showing a generator installation area in the dual rotor wind turbine of FIG. 2.
Figure 7:
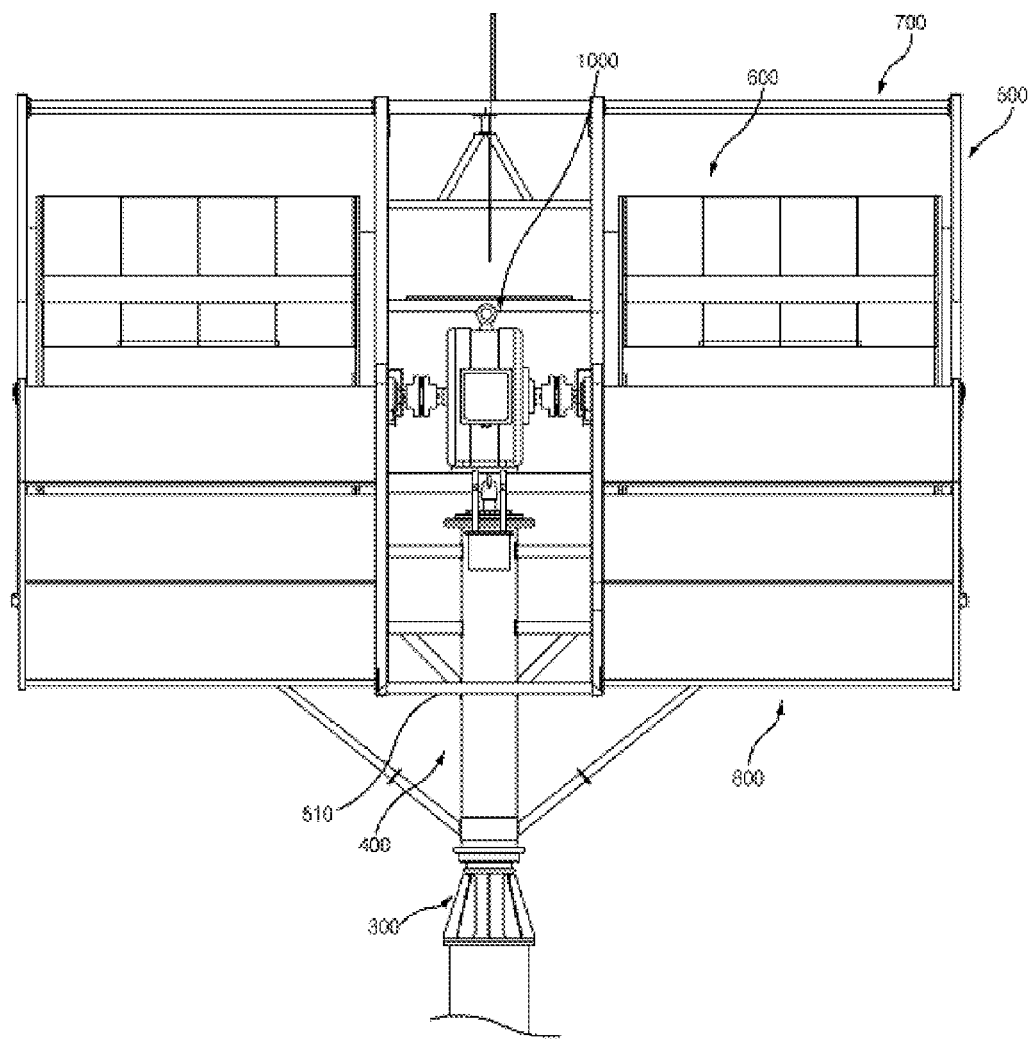
FIG. 7 is a front view showing a dual rotor wind turbine according to a second exemplary embodiment.

FIG. 2 is a perspective view showing a dual rotor wind turbine according to a first exemplary embodiment. FIG. 3 is a sectional view showing the dual rotor wind turbine according to the exemplary embodiment, in which a vertical shaft is assembled with a column. FIG. 4 is a front view of the dual rotor wind turbine according to the exemplary embodiment. FIG. 5 is a side view of the dual rotor wind turbine according to the exemplary embodiment. FIG. 6 is an enlarged perspective view showing a generator installation area in the dual rotor wind turbine of FIG. 2. FIG. 7 is a front view showing a dual rotor wind turbine according to a second exemplary embodiment.

As shown in FIG. 2 through FIG. 7, the exemplary dual rotor wind turbine comprises a column 300 and a generating unit. The generating unit comprises a vertical shaft 400 axially, rotatably mounted to the column 300, a main frame 500 mounted to the vertical shaft 400, a rotor assembly 600 horizontally placed in each side of the vertical shaft 400 and rotatably mounted in the main frame 500, an inlet guide vane 800 mounted to the main frame 500 such that it is placed in a lower location in front of each rotor assembly 600, an upper guide vane 700 mounted to the main frame 500, a tail wing 900 connected to the main frame 500, and a generator 1000 connected to the rotor assemblies 600. The rotor assembly 600 comprises a horizontal rotor shaft 610, a rotor frame 620 radially, circumferentially mounted to each end of the rotor shaft 610, and a rotor blade 630 mounted in the rotor frame 620 at a location close to an outside end of the rotor frame 620. In the rotor assembly 600, the rotor shaft 610 is placed in back of the vertical shaft 400 such that the rotor shaft 610 is offset from the vertical shaft 400.

As shown in FIG. 3, the column 300 has a hollow cylindrical structure and is vertically and securely installed on the ground.

The column 300 is provided with seating grooves in the outer surfaces of upper and lower portions thereof.

The vertical shaft 400 has a hollow cylindrical structure, with an inner diameter thereof larger than the outer diameter of the column 300.

The vertical shaft 400 is provided with flanges 403a and 403b at upper and lower ends thereof.

A first installation ring 404a, 404b is mounted to each of the upper and lower flanges 403a and 403b of the vertical shaft 400. A second installation ring 405a, 405b is mounted to each of the first installation rings 404a and 404b. Due to the use of the first installation rings 404a, 404b and the second installation rings 405a, 405b, bearings and seal rings S, which will be described later herein, can be easily installed in respective locations and, when the bearings and sealing rings are disabled, they can be easily repaired or replaced with new ones.

The first installation ring 404a, which is provided in the upper end of the vertical shaft 400, comprises a flange part 406 mounted to the flange 403a of the vertical shaft 400, a cylindrical part 407 inserted into the vertical shaft 400, and an inner ring part 408 protruding inwards from the lower end of the cylindrical part 407.

The inner circumferential surface of the cylindrical part 407 is provided with a bearing seat groove for seating a bearing therein.

The inner circumferential surface of the inner ring part 408 is provided with a seal ring seat groove for seating a seal ring S therein.

The second installation ring 405a, which is provided in the upper end of the vertical shaft 400, comprises a flange part 409 mounted to the flange part 406 of the first installation ring 404a, and an insert part 410 inserted into the cylindrical part 407 of the first installation ring 404a.

The lower surface of the insert part 410 is provided with a bearing seat groove for seating a bearing therein and the inner circumferential surface of the insert part 410 is provided with a seal ring seat groove for seating a seal ring S therein.

The first installation ring 404b provided in the lower end of the vertical shaft 400 comprises a flange part 406 mounted to the lower flange 403b of the vertical shaft 400, a cylindrical part 411, and an inner ring part 408 protruding inwards from the upper end of the cylindrical part 411.

The inner circumferential surface of the cylindrical part 411 is provided with a bearing seat groove for seating a bearing therein.

The inner circumferential surface of the inner ring part 408 is provided with a seal ring seat groove for seating a seal ring S therein.

The second installation ring 405b provided in the lower end of the vertical shaft 400 comprises a flange part 409 mounted to the cylindrical part 411 of the first installation ring 404b, an insert part 410 inserted into the cylindrical part 411 of the first installation ring 404b, and a support part 412 protruding from the upper end of the insert part 410.

The inner circumferential surface of the insert part 410 is provided with a seal ring seat groove for seating a seal ring S therein.

The vertical shaft 400 is placed so as to surround the column 300 and is mounted thereto such that the vertical shaft 400 can be rotated relative to the column 300.

Bearings are provided between the vertical shaft 400 and the column 300, so that the vertical shaft 400 can be smoothly rotated relative to the column 300. The bearings are seated in the bearing seat grooves of the column 300, the first installation rings 404a, 404b and the second installation ring 405a. One bearing, which is placed in the lower end of the vertical shaft 400, is supported by the support part 412.

The bearings comprise a first bearing 301 and a second bearing 302.

The first bearing 301 comprises an upper race and a lower race, which is placed below the upper race. The lower surface of the upper race and the upper surface of the lower race are provided with respective ball seat grooves. Balls are placed in the ball seat grooves of the upper and lower races of the first bearing 301.

The second bearing 302 comprises an inner race and an outer race, which is placed outside the inner race. The outer circumferential surface of the inner race and the inner circumferential surface of the outer race are provided with respective ball seat grooves. Balls are placed in the ball seat grooves of the inner and outer races of the second bearing 302.

One first bearing 301 and one second bearing 302 are provided between the vertical shaft 400 and the upper end of the column 300. Another one second bearing 302 is provided between the vertical shaft 400 and the lower end of the column 300.

The first bearing 301, which is provided between the vertical shaft 400 and the upper end of the column 300, is placed at a location higher than that of the second bearing 302.

The lower race of the first bearing 301 is supported by the inner race of the second bearing 302.

A support ring 303 is placed between the inner race of the second bearing 302 and the first bearing 301, so that the two bearings 301 and 302 can be prevented from interfering with each other and the first bearing 301 is increasingly supported so as to be more stable.

Further, an oil inlet hole 401 for introducing lubrication oil to the bearings placed between the column 300 and the vertical shaft 400 is formed in the outer circumferential surface of the column 300 or in the inner circumferential surface of the vertical shaft 400. In the embodiment shown in the drawings, the oil inlet hole 401 is formed in the vertical shaft 400.

Further, an oil chamber 402 for containing the lubrication oil therein is defined between the column 300 and the vertical shaft 400.

The lubrication oil contained in the oil chamber 402 lubricates the bearings and realizes smooth operation of the bearings.

Seal rings S are seated in the seal ring seat grooves of the first installation rings 404a, 404b and the second installation rings 405a, 405b at locations between the column 300 and the vertical shaft 400 such that the seal rings S are placed above and below the bearings.

As shown in FIG. 4, the main frame 500 is securely mounted to the outer circumferential surface of the vertical shaft 400.

The main frame 500 comprises two support frames 560, which have a rectangular shape and are mounted to the vertical shaft 400 such that the two support frames 560 are spaced apart from each other. The main frame 500 further comprises a connection frame 510, which connects the two support frames 560 to each other.

Each of the two support frames 560 comprises two vertical frames 561, which are placed at opposite sides, and a horizontal frame, which connects the two vertical frames 561 to each other.

As shown in FIG. 5, a first installation frame 520 is installed at a lower location in front of the vertical frames 561. The first installation frame 520 comprises a plurality of inclined frames, a connection frame connecting the inclined frames to each other, and a reinforcing frame placed between the inclined frames.

A second installation frame 540 is installed at an upper location in back of the vertical frames 561.

The second installation frame 540 comprises an inclined frame and a connection frame connecting an end of the inclined frame to the vertical frames 561.

Further, a third installation frame 580 is installed at a location in back of the vertical frames 561 such that the location of the third installation frame 580 is below the second installation frame 540.

The third installation frame 580 comprises an inclined frame and a connection frame connecting an end of the inclined frame to the vertical frames 561.

The rotor assemblies 600 are horizontally placed in opposite sides of the vertical shaft 400 and are rotatably mounted to the main frame 500.

As shown in FIG. 5, the rotor assembly 600 comprises a horizontal rotor shaft 610, a rotor frame 620, which is radially and circumferentially mounted to each end of the rotor shaft 610, and a plurality of arc-shaped rotor blades 630, which are mounted to the rotor frame 620 at locations close to the outer circumferential corners of the rotor frame 620.

Opposite ends of the rotor shaft 610 are mounted to the third installation frames 580. A bearing B is provided between the rotor shaft 610 and each of the third installation frames 580 such that the rotor shaft 610 can be rotated relative to the third installation frames 580.

The rotor shaft 610 is placed in back of the vertical shaft 400 such that the rotor shaft 610 is offset from the vertical shaft 400.

The rotor frame 620 comprises a plurality of radially placed first frames 621, a plurality of circumferentially placed second frames 622 connecting the first frames 621 to each other. Described in detail, the second frames 622 are mounted to the first frames 621 at locations around the rotor blades 630.

The rotor frame 620 includes six first frames 621, so that the second frames 622 form a hexagonal structure.

The number of the first frames 621 can be changed depending on the number of the rotor blades 630.

Each of the rotor blades 630 has a subcylindrical shape (cup shape) with a semicircular cross-section.

Further, the rotor blades 630 are provided with respective reinforcing frames therein for maintaining the shape of the rotor blades 630.

The number of rotor blades 630 may be preferably set to be from four to ten.

Figure 8:
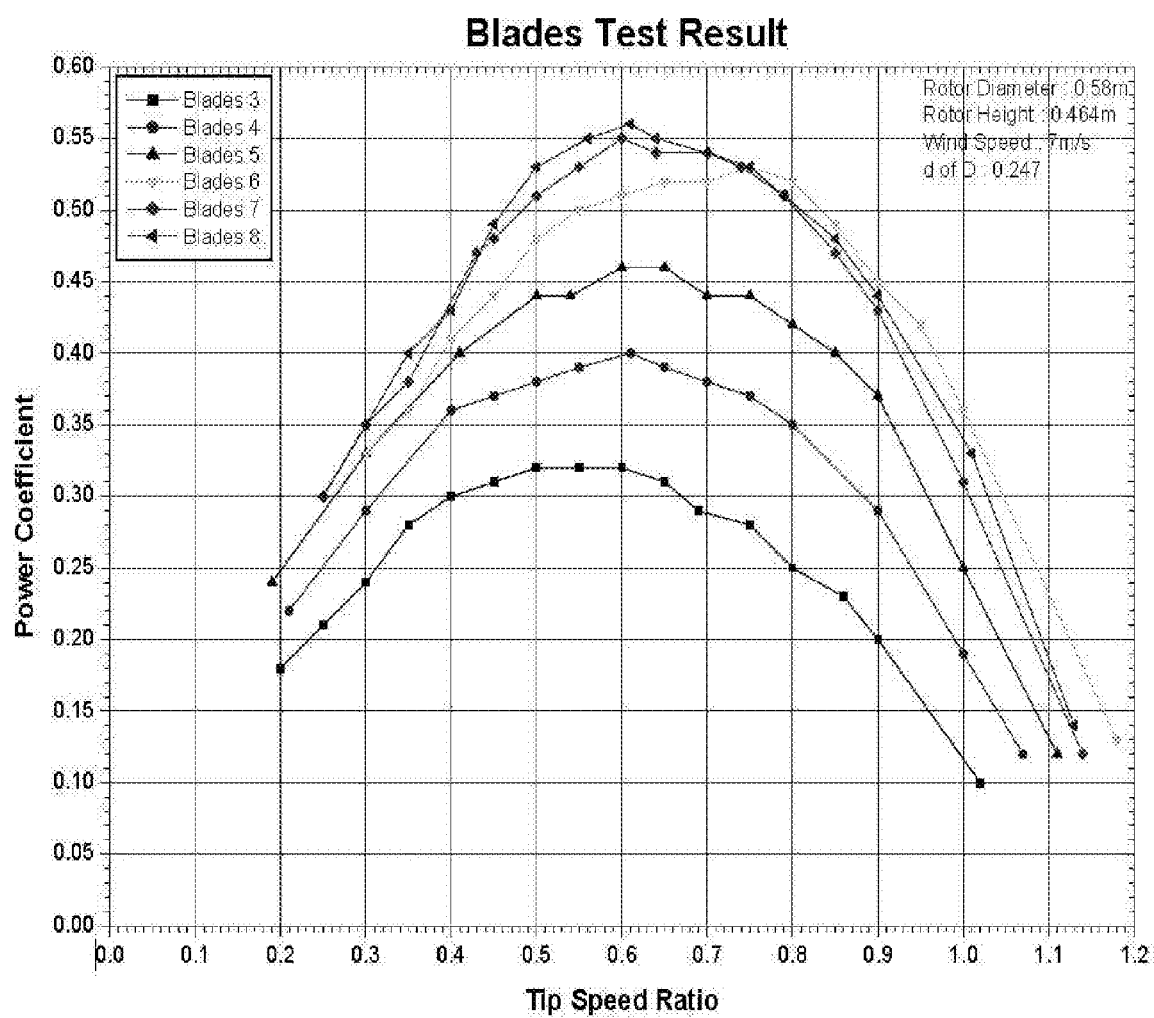
FIG. 8 is a graph illustrating the performance of the exemplary dual rotor wind turbine according to the number of rotor blades.

A performance test data graph, which has the results of tests of wind turbines according to the exemplary embodiment which were executed at varying numbers of rotor blades 630, is shown in FIG. 8. (d/D=0.247, U (wind speed)=7 m/s)

Figure 9:
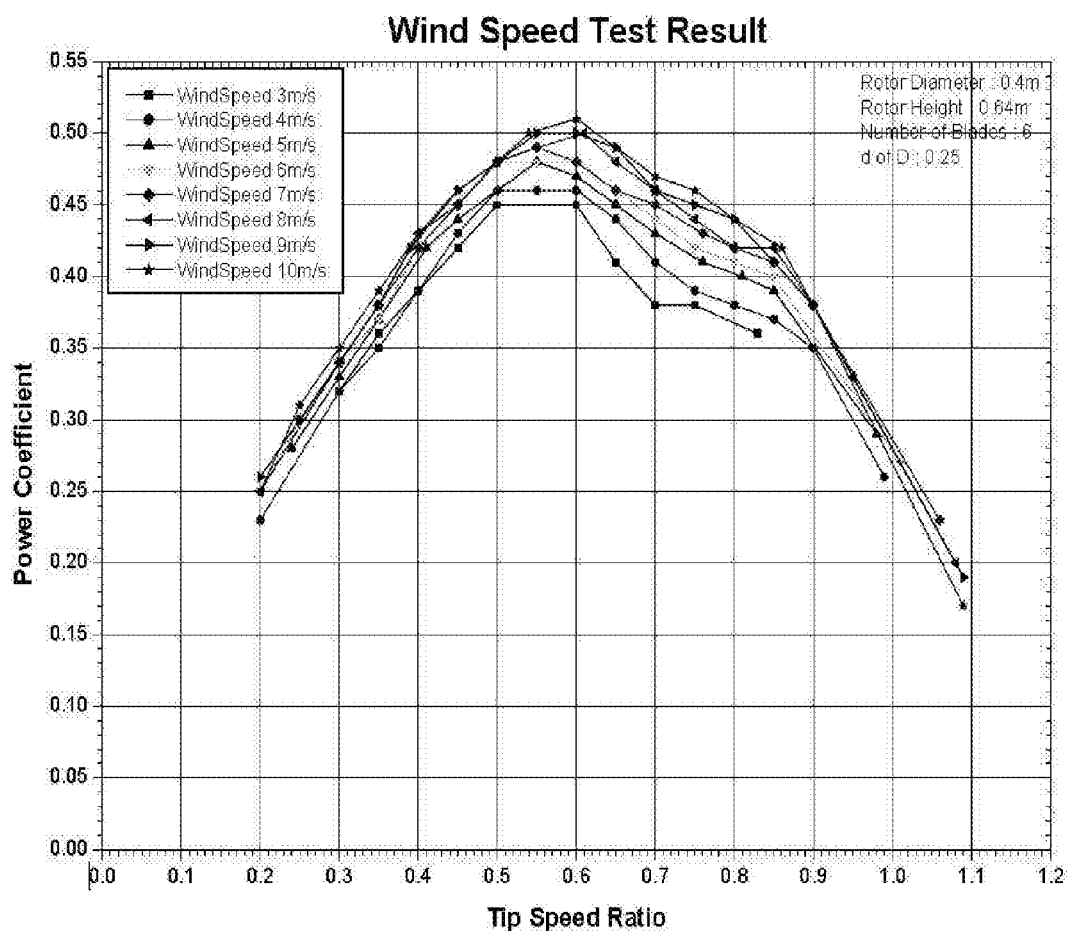
FIG. 9 is a graph illustrating the performance of the exemplary dual rotor wind turbine according to the wind speed.
Figure 10:
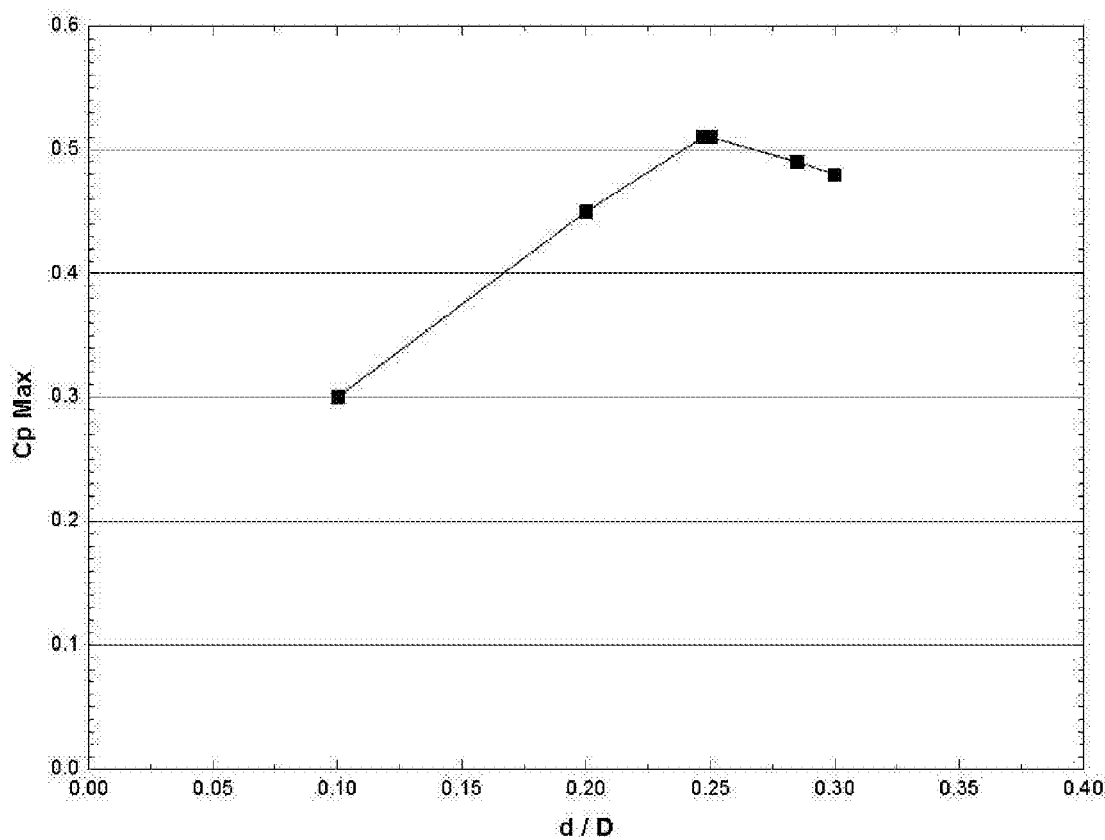
FIG. 10 is a graph illustrating the maximum Cp of the exemplary dual rotor wind turbine according to d/D.

Further, FIG. 9 shows a performance test data graph, which has the results from tests of a wind turbine according to the exemplary embodiment which were executed at various wind speeds. (d/D=0.25, Z (number of blades)=6)

Further, d/D (rotor blade diameter/rotor diameter) was set from 0.15 to 0.35.

FIG. 9 is a test data graph of the maximum Cp (power coefficient) according to d/D. (Z (number of blades)=6, U (wind speed)=7 m/s)

The wind turbine according to an exemplary embodiment having the rotor blades 630 may have a high maximum turbine efficiency of 0.52, TSR (Tip Speed Ratio) of 0.5~0.75 (capable of realizing a wide range of operation control of the turbine), a light weight, high H/D (rotor height/rotor diameter) of 1.0 or higher (not exerting an influence on efficiency), and can be easily produced (Z=6).

The inlet guide vane 800 is mounted to the first installation frames 520 of the main frame 500 such that the inlet guide vane 800 is placed at a lower location in front of the rotor assembly 600.

The inlet guide vane 800 receives the wind from the atmosphere and increases the wind speed, and guides the wind to the rotor assembly 600.

The inlet guide vane 800 has three guide plates 810 having an arc shape. The three guide plates 810 are spaced apart from each other.

Further, opposite sides of the inlet guide vane 800 are closed by respective side plates.

The upper guide vane 700 is mounted to the second installation frames 540 of the main frame 500 such that the upper guide vane 700 is placed at an upper location in back of the rotor assembly 600.

The upper guide vane 700 guides the wind, which flows outwards from the upper end of the rotor assembly 600, to the rotor assembly 600.

The upper guide vane 700 includes one arc-shaped guide plate 710.

Further, opposite sides of the upper guide vane 700 are closed by respective side plates.

The tail wing 900 is mounted to the upper end of the vertical frame 561 of the main frame 500, thus being connected to the main frame 500.

The tail wing 900 is supported by a vertical support frame (not shown), which is mounted to the second installation frame 540.

The tail wing 900 is mounted to the vertical frame 561 by a connection frame 910.

The tail wing 900 is placed in back of the rotor assembly 600.

As shown in FIG. 6, the generator 1000 is connected to the rotor assembly 600 and converts the rotational energy of the rotor assembly 600 into an electric energy.

The generator 1000 is placed perpendicularly to the rotor shaft 610 and is connected to the rotor assembly 600 by the gear box 2000.

The gear box 2000 has bevel gears therein and transmits the rotating force of the rotor shaft 610 to the generator 1000.

The wind turbine may further include a housing (not shown), which houses both the gear box 2000 and the generator 1000 therein. The housing can protect both the generator 1000 and the gear box 2000.

As another example, as shown in FIG. 7, the generator 1000 may be directly connected to the rotor shaft 610 of the rotor assembly 600.

The generator 1000 is mounted to the connection frame 510 such that the generator 1000 is placed between the two rotor assemblies 600.

Hereinbelow, the operation of the wind turbine will be described.

When the wind is input to the rotor assembly 600 through the inlet guide vane 800, the rotor assembly 600 rotates. The rotating force of the rotor assembly 600 is transmitted to the generator 1000 through the gear box 2000. The generator 1000 converts the rotating force into electricity.

The tail wing 900 moves depending on the direction of the wind and the generating unit including the main frame 500 and the vertical shaft 400 is rotated relative to the column 300. Thus, the wind turbine may have increased power generating performance.

Figure 11:
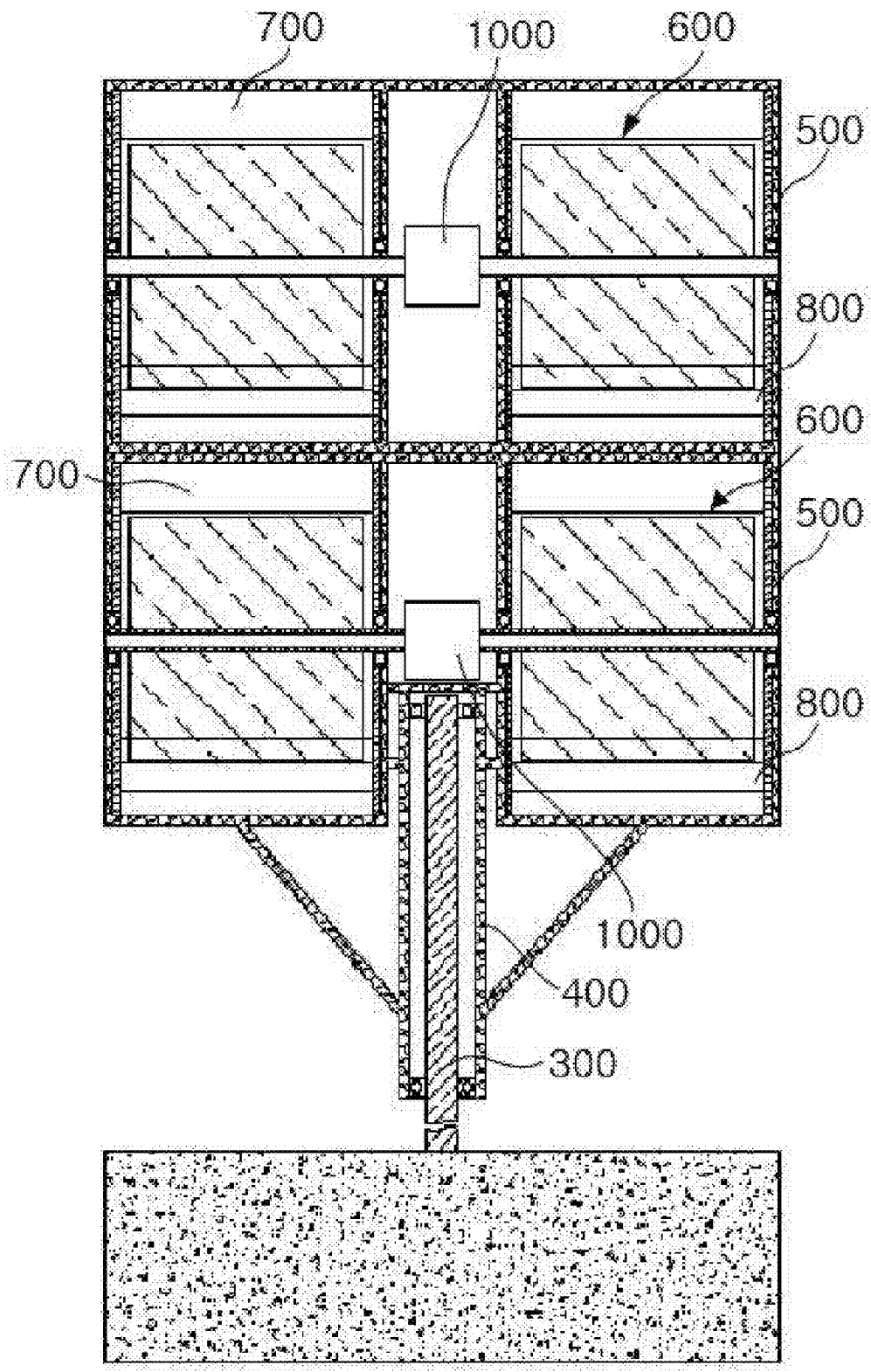
FIG. 11 is a schematic sectional view showing a dual rotor wind turbine according to a third exemplary embodiment.

As shown in FIG. 11, the wind turbine may have two generating units. The two generating units may be placed at upper and lower locations.

The two generating units have respective main frames 500 and the main frames 500 are placed at upper and lower locations, and are connected to each other.

Figure 12:
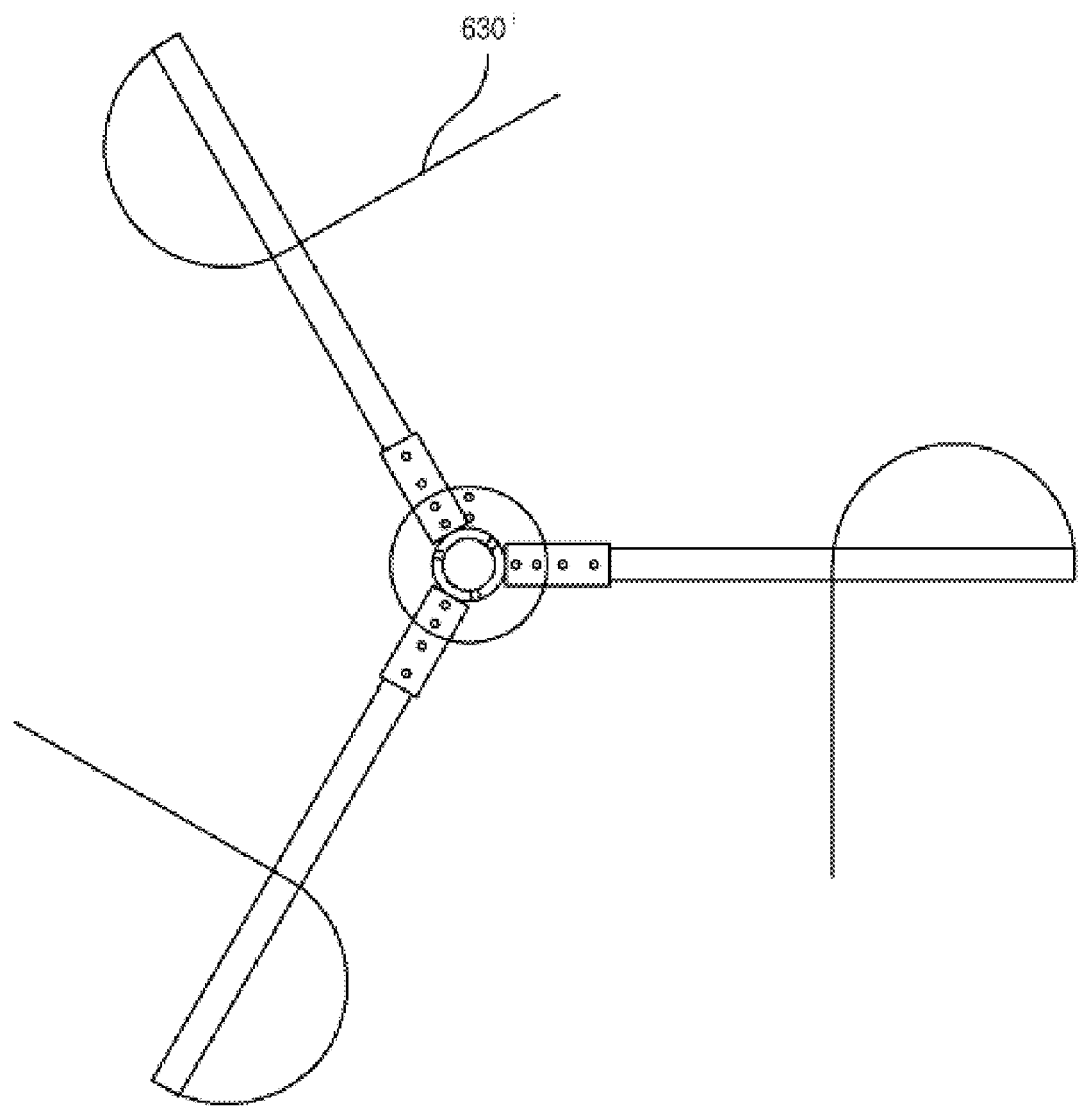
FIG. 12 is a schematic side view showing a dual rotor wind turbine according to a fourth exemplary embodiment.

Further, as shown in FIG. 12, the rotor blades 630' of the rotor assembly may have an asymmetrical arc shape. In other words, each of the rotor blades 630' is asymmetrically shaped such that it forms an asymmetrical arc shape based on a horizontal center axis thereof. Therefore, one horizontal end of each rotor blade 630' protrudes and is longer than the other end.

Figure 13:
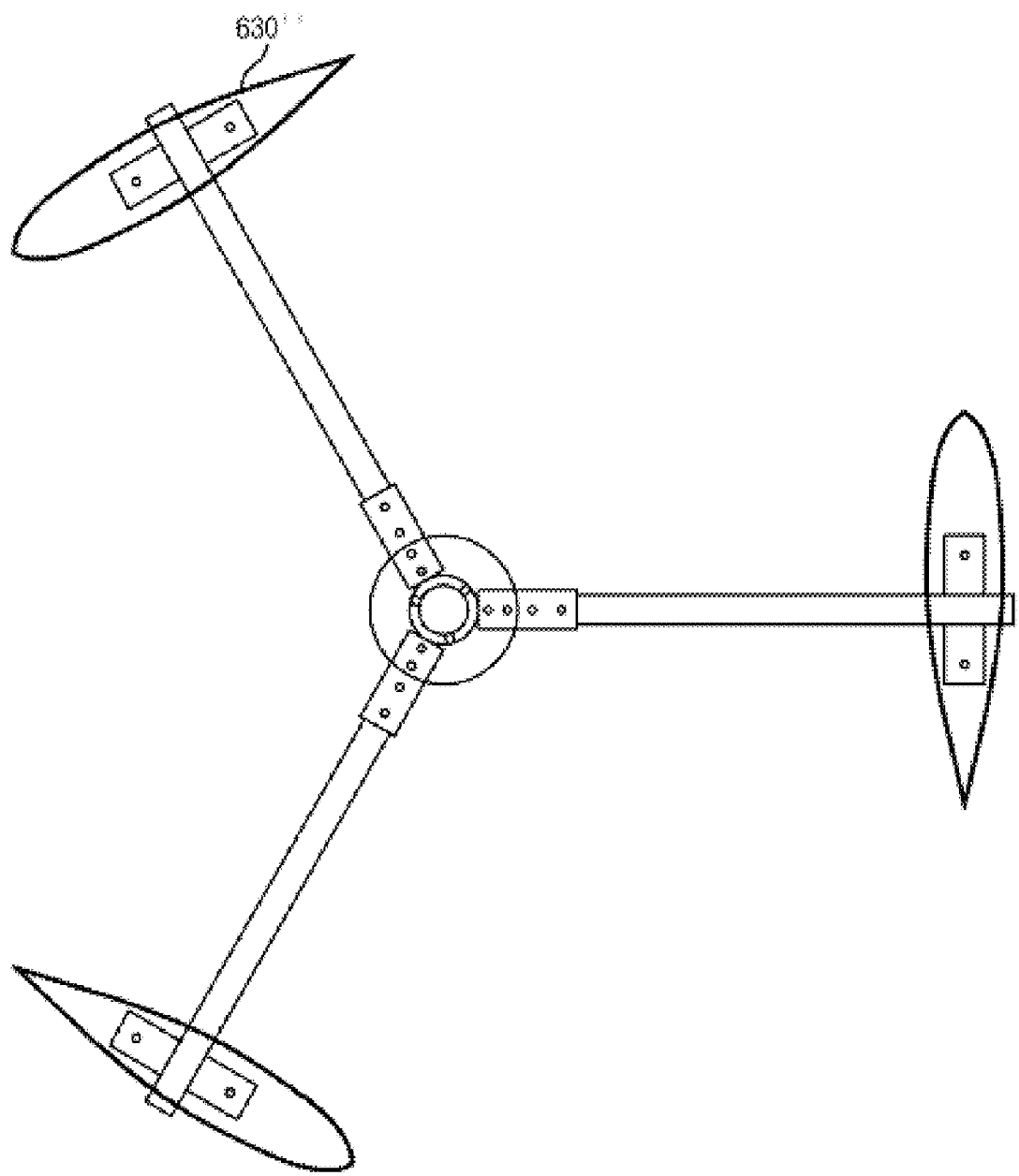
FIG. 13 is a schematic side view showing a dual rotor wind turbine according to a fifth exemplary embodiment.

As shown in FIG. 13, the rotor blades 630" of the rotor assembly may have an airfoil shape.

As apparent from the above description, a wind turbine according to teachings provided herein can be adapted to a dual rotor wind turbine having both an inlet guide vane and an upper guide vane.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A dual rotor wind turbine comprising:
   a column; and
   a generating unit comprising: a vertical shaft rotatably mounted to the column, a main frame mounted to the vertical shaft, a rotor assembly horizontally placed in each side of the vertical shaft and rotatably mounted to the main frame, an inlet guide vane mounted to the main frame and placed at a lower location in front of the rotor assembly, an upper guide vane mounted to the main frame, a tail wing connected to the main frame, and a generator connected to the rotor assembly, wherein
   the rotor assembly comprises: a horizontal rotor shaft, a rotor frame radially and circumferentially mounted to each end of the rotor shaft, and a rotor blade mounted to the rotor frame at a location close to an outside end of the rotor frame, and
   the rotor shaft is placed in back of the vertical shaft such that the rotor shaft is offset from the vertical shaft,
   the vertical shaft comprises flanges at upper and lower ends thereof,
      a first installation ring is provided in the upper end of the vertical shaft and comprises a flange part mounted to one of the flanges of the vertical shaft, a cylindrical part inserted into the vertical shaft, and an inner ring part protruding inwards from a lower end of the cylindrical part,
      an inner circumferential surface of the cylindrical part comprises a bearing seat groove for seating a bearing therein,
      an inner circumferential surface of the inner ring part comprises a seal ring seat groove for seating a seal ring (S) therein,
      a second installation ring is provided in the upper end of the vertical shaft and comprises a flange part mounted to the flange part of the first installation ring, and an insert part inserted into the cylindrical part of the first installation ring, and
      a lower surface of the insert part comprises a bearing seat groove for seating a bearing therein and an inner circumferential surface of the insert part is provided with a seal ring seat groove for seating another seal ring (S) therein.

2. The dual rotor wind turbine according to claim 1, wherein the generating unit comprises two generating units and the two generating units are placed at upper and lower locations.

3. The dual rotor wind turbine according to claim 2, wherein the rotor blade has an arc shape.

4. The dual rotor wind turbine according to claim 2, wherein the rotor blade has an asymmetrical arc shape.

5. The dual rotor wind turbine according to claim 2, wherein the rotor blade has an airfoil shape.

6. The dual rotor wind turbine according to claim 1, wherein the rotor blade has an arc shape.

7. The dual rotor wind turbine according to claim 1, wherein the rotor blade has an asymmetrical arc shape.

8. The dual rotor wind turbine according to claim 1, wherein the rotor blade has an airfoil shape.

* * * * *